Figure 1:
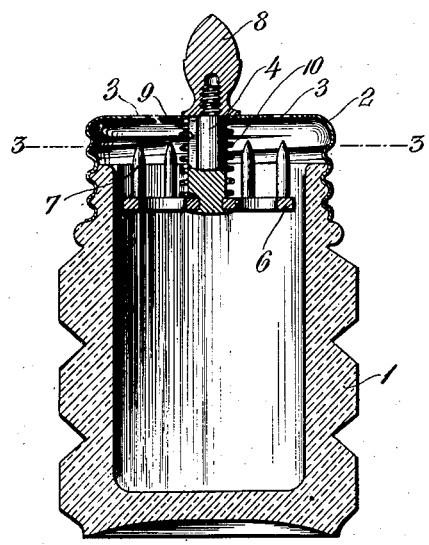

No. 810,107. PATENTED JAN. 16, 1906.
A. COHENCIUS.
DISTRIBUTER FOR FINELY DIVIDED SUBSTANCES.
APPLICATION FILED SEPT. 13, 1905.

WITNESSES:
John O. Gempler.
Timothy E. Raftery

INVENTOR
Abraham Cohencius
BY his ATTORNEYS
Kenyon & Kenyon

UNITED STATES PATENT OFFICE.

ABRAHAM COHENCIUS, OF NEW YORK, N. Y.

DISTRIBUTER FOR FINELY-DIVIDED SUBSTANCES.

No. 810,107.     Specification of Letters Patent.     Patented Jan. 16, 1906.

Application filed September 13, 1905. Serial No. 278,232.

*To all whom it may concern:*

Be it known that I, ABRAHAM COHENCIUS, a citizen of the United States, and a resident of the city of New York, county and State of New York, have invented certain new and useful Improvements in Distributers for Finely-Divided Substances, of which the following is a specification.

My invention relates to tops or covers for receptacles for powdered or finely-divided substances.

The principal object of my invention is to provide means for readily and instantly clearing the holes or perforations of the cover when they may be closed or partially closed by the substance in the receptacle becoming damp and clogging the holes or from any other cause.

My invention is particularly applicable to salt holders or receptacles having perforated tops, the perforations of which constantly become clogged by damp salt in the holder.

My invention consists of the receptacle top or cover, of its several parts and elements, and combinations of parts and elements, all as hereinafter described and set forth, and as shown in the drawings.

The accompanying drawings illustrate one embodiment of my invention as applied to a receptacle for salt or other finely-divided substance, in which—

Figure 2:
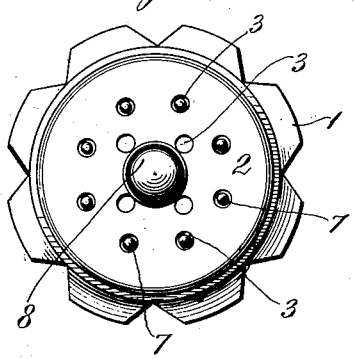
Figure 3:
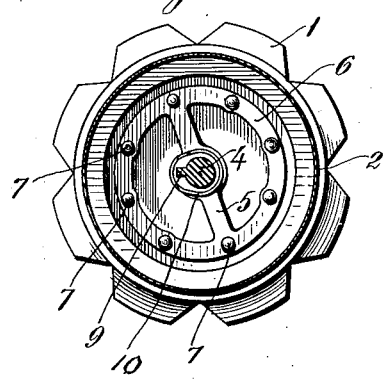

Figure 1 is a vertical section of said receptacle with the cover attached thereto. Fig. 2 is a plan view of the same, and Fig. 3 is a transverse section on the line 3 3 of Fig. 1.

Similar numbers represent like parts in all the figures.

1 is a receptacle or holder for powdered or finely-divided substances, such as salt, sugar, or the like.

2 is a top or cover for the receptacle provided with the usual holes or perforations 3, through which the substance in the receptacle may be shaken. As shown in the drawings, the cover 2 is screwed upon the receptacle 1, although any means may be used for securing the cover to the receptacle. 4 is a rod which passes through the cover 2. Secured to the inner portion of this rod is a lateral extension, said extension, as shown in the drawings, being a cross-bar 5, and a ring 6, connecting the outer ends of said cross-bar.

7 represents pins which are secured to the ring 6 and extend in the same direction as the rod 4. These pins are preferably tapered at their free ends and are adapted to register with the perforations 3 and having a diameter a trifle smaller than said perforations.

The rod 4 is provided with a handle 8, which is screwed to the outer or free end of said rod, the lower end of the handle 8 extending laterally over the opening in the cover 2, through which the rod 4 passes, so as to form a stop to prevent the rod and the pins 7 from dropping down into the receptacle 1 away from the cover 2. When the handle 8 is secured to the rod 4, it is integral with the same and virtually a part of said rod. The rod 4 is also provided with a longitudinal spline 9, which engages with a corresponding recess in the cover 2, said spline and recess serving to keep the pins 7 in register with the holes 3 and to enable said pins to pass into and out of said holes without the pins getting out of place. A tension-spring 10 encircles the rod 4 between the cover 2 and the lateral extension 5 of the rod 4, said spring serving to normally keep the pins 7 out of engagement and away from the perforations 3, but permitting the extension 5, ring 6, and pins 7 to be drawn up by the handle 8, so that said pins will pass through said perforations.

From the above it will be seen that if the salt, sugar, or other substance in the receptacle 1 cannot be shaken through the perforations 3 by reason of said perforations being clogged by the damp substance on the cover or from any other cause, the perforations 3 can be instantly cleared by drawing the pins 7 through said perforations by means of the handle 8. Upon releasing the handle the spring 9 will draw the pins 7 away from the perforations 3 to their normal positions, the lateral extension of the handle 8 forming a stop to the movement of the parts caused by the spring and the perforations 3 will be clear, so that the substance in the receptacle 1 can be shaken through said perforations. The parts can be instantly and readily taken apart at any time, so that they may be cleaned and replaced or for any other cause. It will also be seen that the different parts can be readily and cheaply made and that my invention can be applied to any perforated top of a similar receptacle.

What I claim as new, and desire to secure by Letters Patent, is—

1. A cover for a receptacle for finely-divided substances, said cover provided with holes or perforations, a rod passing through an opening in said cover and adapted to slide in said opening, a lateral extension to the inside of said rod, and pins projecting from said extension in substantially the same direction as said rod, and a spline on the rod engaging with a recess in the cover for keeping the pins in register with the perforations.

2. A cover for a receptacle for finely-divided substances, said cover provided with holes or perforations, a rod passing through an opening in said cover and adapted to slide in said opening, a lateral extension to the inside of said rod, and pins projecting from said extension in substantially the same direction as said rod, and a lateral extension or stop on the outside of said rod, and a tension-spring held between the cover and the inner lateral extension of the rod for keeping said pins away from said perforations unless positively drawn to or through the same against the action of the spring.

In testimony whereof I have signed my name to this specification in the presence of two subscribing witnesses.

ABRAHAM COHENCIUS.

Witnesses:
PENNINGTON HALSTED,
EDWIN SEGER.